Figure 1:
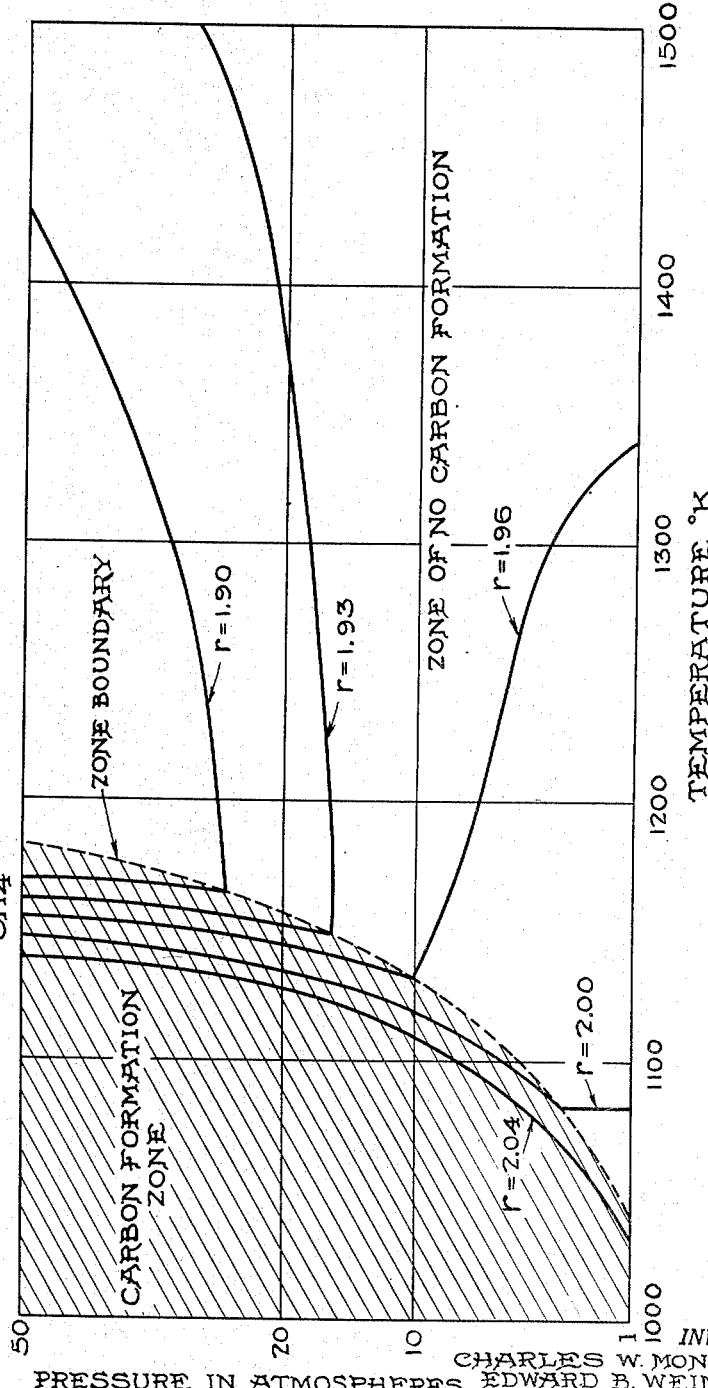

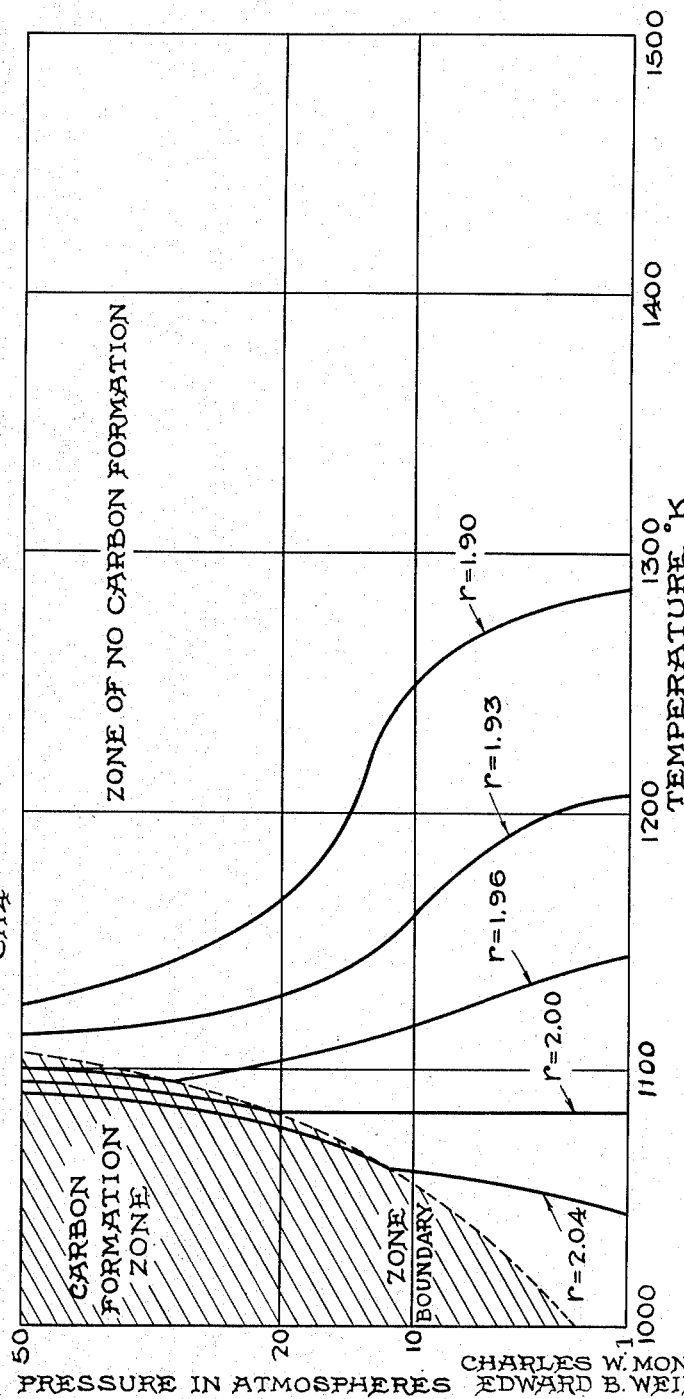

United States Patent Office 2,699,383
Patented Jan. 11, 1955

2,699,383

SYNTHESIS GAS MANUFACTURE

Charles W. Montgomery, Oakmont, and Edward B. Weinberger, Pittsburgh, Pa., assignors to Gulf Research & Development Company, Pittsburgh, Pa., a corporation of Delaware Application December 4, 1947, Serial No. 789,696

5 Claims. (Cl. 48—196)

This invention relates to synthesis gas manufacture, and more particularly it is concerned with the manufacture of synthesis gas mixtures of hydrogen and carbon monoxide useful in the synthesis of normally liquid hydrocarbons.

It is well known in the art that liquid hydrocarbons can be synthesized from gaseous mixtures of hydrogen and carbon monoxide, normally referred to as synthesis gas, by passing them over iron, nickel or cobalt catalysts at temperatures between 200° and 400° C. and at pressures between 1 and 50 atmospheres. It is generally recognized that the catalysts used in the above synthesis are relatively sensitive and are poisoned by impurities in the synthesis gas. Thus it is common practice to remove sulfur-containing impurities from synthesis gas prior to its passage over the synthesis catalyst, and it has also been attempted to remove finely divided carbon from the synthesis gas. The latter has proven very difficult.

In the generation of synthesis gas, it is known that several reactions take place, the overall effect of which is to produce hydrogen and carbon monoxide. Among such reactions are:

(1) $$CH_4 \rightleftarrows 2H_2 + C$$
and
(2) $$2CO \rightleftarrows CO_2 + C$$

As shown, these reactions produce solid carbon which tends to remain suspended in the synthesis gas. Great difficulty has been encountered in the art in preventing the formation of carbon and in securing its removal from the synthesis gas after it has been formed. The difficulty in removing the carbon resides in the fact that it is extremely finely divided and therefore remains suspended in the synthesis gas even after having passed through a series of scrubbers and conventional filtering equipment. Costly special equipment is thus required if the carbon is to be removed. If the finely divided carbon is not removed from the synthesis gas, it deposits on the catalyst used for the synthesis of normally liquid hydrocarbons and injures the activity of the catalyst to such an extent as to necessitate catalyst reactivation or replacement. Furthermore, the finely divided carbon in the synthesis gas gradually deposits in the synthesis gas generator and effluent lines therefrom, eventually causing a shut-down of the gas generation equipment. In addition, the finely divided carbon may deposit on the rotors of turbo-compressors used for compression of the synthesis gas to the pressures required for the hydrocarbon synthesis, thus causing operating and maintenance difficulties because of the resulting unbalance. Even small amounts of finely divided carbon, of the order of 0.1 to 0.01 per cent, are objectionable since with the large throughputs of synthesis gas the deposits gradually build up to cause the above-mentioned difficulties.

Accordingly, it is an object of our invention to generate synthesis gas while preventing the formation of substantial amounts of finely divided carbon.

It is a further object of our invention to manufacture synthesis gas in such manner as to avoid shut-down of the synthesis gas generating unit because of deposition of carbon.

These and other objects are accomplished by the present invention where, in the manufacture of synthesis gas mixtures containing hydrogen and carbon monoxide from carbonaceous materials at elevated temperatures and pressures, the formation of substantial amounts of finely divided carbon is prevented by reducing the pressure on the synthesis gas mixture while maintaining the temperature in excess of that resulting in the formation of finely divided carbon, and then cooling the synthesis gas mixture to a temperature below 1040° K. Alternatively or additionally, the formation of substantial amounts of finely divided carbon in the synthesis gas may be prevented by adding to the synthetic gas mixture, while at the elevated temperature at which it is formed, at least one gas reactive with carbon selected from the group consisting of oxygen, hydrogen, steam, carbon dioxide and mixtures thereof.

We have found that, in the manufacture of synthesis gas from a carbonaceous material, at any given pressure on the gaseous system, there is a given temperature above which the gases must be maintained in order to avoid the formation of finely divided carbon. Furthermore, even though the synthesis gas is formed without forming finely divided carbon, if, in adjusting the temperature and pressure of the synthesis gas for use in the subsequent hydrocarbon synthesis, the temperature is lowered indiscriminately without regard to the pressure, carbon formation will result. In accordance with our invention, therefore, in cooling freshly generated synthesis gas for use in the subsequent hydrocarbon synthesis, it is essential that the cooling take place at such pressure that no carbon formation is encountered. Since higher pressures favor the formation of carbon, both reduction of the temperature and of the pressure on freshly generated synthesis gas is accomplished in such manner as to avoid the formation of finely divided carbon. It is preferred to reduce the pressure after or as the gas leaves the generation zone by throttling the synthesis gas through a valve, turbine or similar pressure lowering device. Since the throttling process results in an absorption of heat, a reduction of temperature of the synthesis gas is accomplished at the same time although the temperature is not reduced to such an extent as to result in the formation of carbon. Ordinarily, therefore, the pressure on the gaseous system is reduced while maintaining the temperature in excess of that resulting in the formation of finely divided carbon. It is preferred that prior to reducing the pressure and temperature, the initial pressure be greater than one atmosphere and the initial temperature greater than 1040° K. When the temperature of the gases reaches 1040° K., it is no longer necessary to exercise particular care in the cooling of the gases, because at such temperature the reactions resulting in the formation of carbon are so slow as to be of negligible significance. Accordingly, when this temperature is reached the gases may be further cooled by quenching with liquid water or by any other suitable means.

We have also found that the addition of gases reactive with carbon selected from the group consisting of oxygen, hydrogen, steam, carbon dioxide and mixtures thereof to the freshly generated synthesis gas while at temperatures above 1040° K. results in avoiding the formation of substantial amounts of finely divided carbon. This embodiment of our invention may take place at any suitable pressure, say from atmospheric to about 50 atmospheres. However, since our invention also contemplates the simultaneous use of both the pressure-reducing step and the addition of gases reactive with carbon, it is desirable to employ pressures greater than one atmosphere when the pressure-reducing step is used simultaneously with the addition of gases reactive with carbon. The effect of adding gases reactive with carbon is equivalent to shifting the temperature at which carbon formation takes place from a higher temperature to a lower temperature. Accordingly, the amounts of such gases added are such as to cause the temperature of carbon formation at any given pressure to approach 1040° K.

Our invention is applicable to the manufacture of synthesis gas by any known method from any carbonaceous material. Suitable carbonaceous materials include coal, coke, mineral oils, natural gas, light hydrocarbon gases and the like. Thus, the synthesis gas may be manufactured by the reaction of coal with steam and oxygen, or the reaction of natural gas with steam and carbon dioxide, or the partial oxidation of methane with oxygen as known in the art.

Our invention may be more readily understood by reference to the attached drawings where there are shown the effects of pressure and temperature on the formation of finely divided carbon in a system where synthesis gas is manufactured by the partial oxidation of methane at elevated temperatures and pressures.

Figure 1 is a graph showing the pressures and temperatures at which carbon formation takes place for a mol ratio of oxygen to methane of 0.55.

Figure 2:
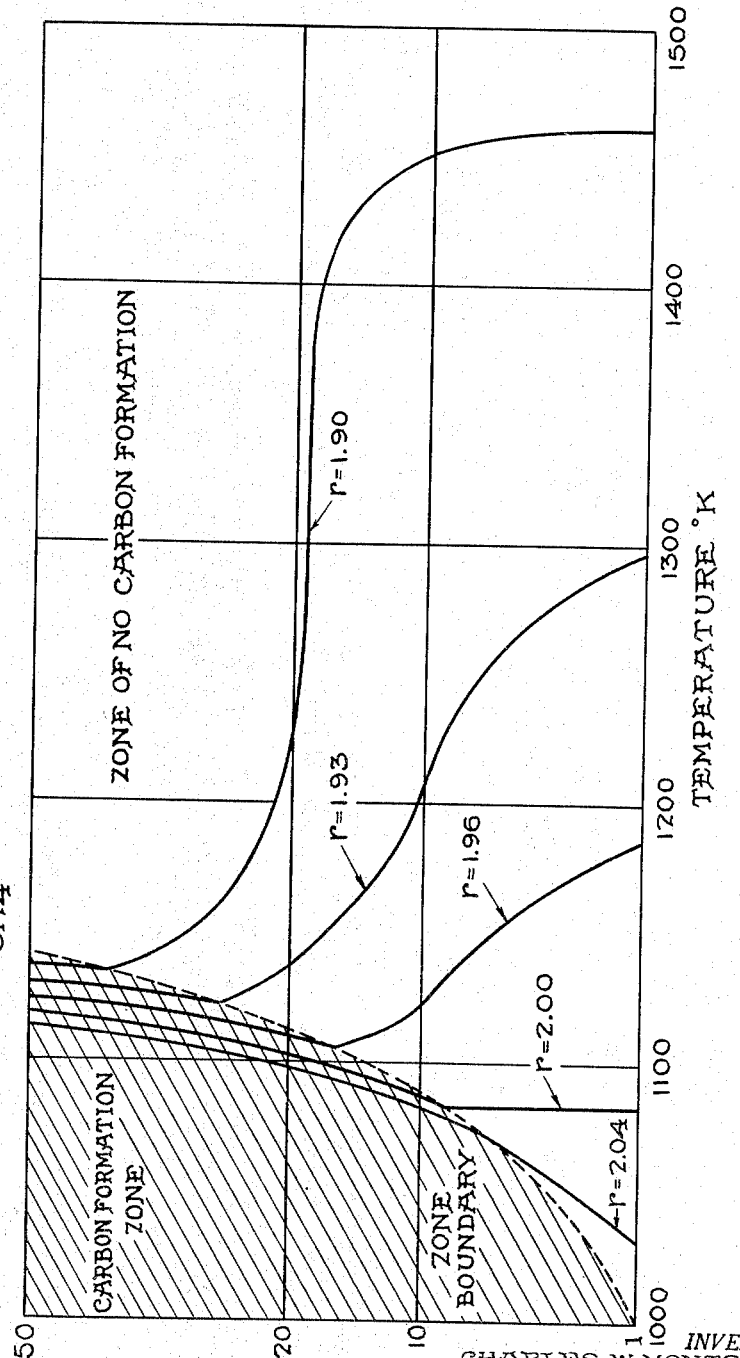

Figures 2 and 3 are graphs similar to Figure 1, except that the oxygen to methane mol ratios are 0.60 and 0.65, respectively.

In each of the figures, the absolute temperature in degrees Kelvin (° K.) is plotted as abscissae and the pressure in atmospheres is plotted as ordinates on a square root scale. On each figure a number of curves are drawn for constant values of the hydrogen to carbon monoxide mol ratio $r$ in equilibrium in a product gas. These curves represent the temperature and pressure conditions which are needed to produce a product gas with the hydrogen to carbon monoxide mol ratios $r$ which are indicated, from a feed gas containing oxygen and methane in the feed ratio $n$ for which the figure is drawn. The point where there is a change from no carbon to carbon formation is determined on each curve. This point usually occurs at a break in the curve. A dotted line curve is then drawn through these points on each of the figures to indicate the boundary between the no carbon and the carbon formation zone. In each figure, there is therefore shown a zone in which carbon formation takes place and another zone in which carbon formation does not take place. The carbon formation zone has been shaded in the drawings and in every instance lies to the left of the dotted line curve which indicates the boundary between the zones. In manufacturing synthesis gas by the partial oxidation of methane with oxygen at elevated temperatures and pressures, the operation is conducted in such manner as to lie in the zone of no carbon formation to the right of the zone boundary; or, if the operation has been conducted in the zone in which carbon formation takes place, the temperature or pressure or both must be adjusted to place the system in the zone in which no carbon formation takes place. As will be noted from the curves, the danger of carbon formation becomes greater as the mol ratio of hydrogen to carbon monoxide approaches 2:1 and also as the pressure is increased. However, in the manufacture of synthesis gas, it is ordinarily possible to operate in the zone of no carbon formation. Difficulties with carbon formation usually arise when it is attempted to cool the gases to the temperature required in the subsequent hydrocarbon synthesis. As will be evident from the figures, if it is attempted to cool the synthesis gas at an elevated pressure without first reducing the pressure, the zone of carbon formation is quickly encountered. Accordingly, we avoid the formation of carbon by reducing the pressure on the gaseous system, thereby providing a greater latitude for cooling the gases without encountering carbon formation than can be obtained if the pressure on the gaseous system is not reduced. For example, in Figure 1, a throttling of the pressure from 20 atmospheres to 1 atmosphere causes the carbon boundary to appear at a temperature about 120° K. lower than it would be at the higher pressure. The temperature of the gases may be reduced simultaneously with or subsequent to the reduction of pressure on the gaseous system, but in any event never to such a degree that the carbon boundary is crossed prior to reaching a temperature lower than 1040° K. The above may be expressed mathematically, that is, the pressure on the synthesis gas mixture is reduced while maintaining the temperature in excess of that represented by the relation:

$$T = 71 \log (p-0.5) + 800 (0.6-n) + 1020$$

where $T$ = the absolute temperature in ° K.,
$p$ = the pressure in atmospheres, and
$n$ = the mol ratio of oxygen to methane used in the manufacture of the synthesis gas and varies from 0.55 to 0.65.

In the embodiment of our invention where a gas reactive with carbon is added to prevent the formation of substantial amounts of finely divided carbon, the reactive gas is preferably introduced into the synthesis gas mixture at the point where the synthesis gas leaves the synthesis gas reactor while at an elevated temperature and pressure. Thus, in the manufacture of synthesis gas by the partial oxidation of methane with oxygen, there may be added at the point where the exit gases leave the synthesis gas generator a stream of carbon dioxide and a stream of steam. While the ratio of steam to carbon dioxide may vary widely and one or the other may be eliminated, it is desirable to add the steam and carbon dioxide in a mol ratio of 2:1. In effect, this results in an increase in the mol ratio of oxygen to methane in the feed gas, although no molecular oxygen as such is added. When steam and carbon dioxide in a mol ratio of 2:1 are added to the exit gases from the synthesis gas generator in order to prevent the formation of finely divided carbon, the amount of said steam and carbon dioxide may be expressed by the relation:

$$f = \frac{3n - 0.339 \log (p+1.7) - 1.41}{0.113 \log (p+1.7) - 1.53}$$

where $f$ = the sum of the mols of steam and carbon dioxide per mol of methane,
$n$ = the mol ratio of oxygen to methane used in the manufacture of synthesis gas and varies from 0.55 to 0.65, and
$p$ = the pressure in atmospheres and varies from 1 to 50 atmospheres.

As disclosed hereinabove, both the addition of steam and carbon dioxide to the exit gases from the synthesis gas generator, and depressuring and cooling of such exit gases may take place simultaneously. The effect on the carbon boundary is then doubled, that is, the carbon boundary shown in the drawings is moved to the left to such an extent that carbon formation takes place at a substantially lower temperature. Since this temperature is at 1040° K. or below, in practice very little carbon formation, if any, will take place.

While we have described our invention with specific reference to the manufacture of synthesis gas by the partial oxidation of methane with oxygen, it is to be understood that it is not limited thereto, since it is applicable to the manufacture of synthesis gas mixtures of hydrogen and carbon monoxide from any carbonaceous material.

What we claim is:

1. In the manufacture of synthesis gas mixtures containing hydrogen and carbon monoxide from carbonaceous materials in a generation zone at pressures of about 10 to about 50 atmospheres and at elevated temperatures in excess of those resulting in the formation of finely divided carbon at the instant pressure, the method of reducing the pressure on the synthesis gas mixture while preventing the formation of substantial amounts of finely divided carbon, which comprises removing the synthesis gas mixture from said generation zone, reducing the pressure on said synthesis gas mixture and cooling the said synthesis gas mixture to a temperature of about 1040° K. while continuously maintaining the temperature in excess of that resulting in the formation of finely divided carbon at the instant pressure and then cooling the synthesis gas mixture to a temperature below 1040° K.

2. The method of claim 1, wherein additionally there is added to the synthesis gas mixture before cooling at least one gas reactive with carbon selected from the group consisting of oxygen, hydrogen, steam, carbon dioxide and mixtures thereof.

3. In the manufacture of synthesis gas mixtures containing hydrogen and carbon monoxide by the partial oxidation of methane with oxygen in a generation zone and at elevated pressures of about 10 to about 50 atmospheres and at elevated temperatures in excess of those resulting in the formation of finely divided carbon at the instant pressure, the method of reducing the pressure on the synthesis gas mixture and cooling the synthesis gas mixture while preventing the formation of substantial amounts of finely divided carbon which comprises removing the gas mixture from said generation zone, reducing the pressure on said synthesis gas mixture and cooling said synthesis gas mixture to a temperature of about 1040° K. while continuously maintaining the temperature in excess of that represented by the relation:

$$T = 71 \log (p-0.5) + 300 (0.6-n) + 1020$$

where $T=$ the absolute temperature in ° K.,
$p=$ the pressure in atmospheres, and
$n=$ the mol ratio of oxygen to methane used in the manufacture of the synthesis gas and varies from 0.55 to 0.65, and then cooling the synthesis gas mixture to a temperature below 1040° K.

4. The method of claim 3, wherein additionally there is added to the synthesis gas mixture before cooling at least one gas reactive with carbon selected from the group consisting of oxygen, hydrogen, steam, carbon dioxide and mixtures thereof.

5. In the manufacture of synthesis gas mixtures containing hydrogen and carbon monoxide by the partial oxidation of methane with oxygen in a generation zone at elevated pressures of about 10 to about 50 atmospheres and at elevated temperatures in excess of those resulting in the formation of finely divided carbon at the instant pressure, the method of reducing the pressure on the synthesis gas mixture and cooling the synthesis gas mixture while preventing the formation of substantial amounts of finely divided carbon which comprises removing the gas mixture from said generation zone, reducing the pressure on said synthesis gas mixture and cooling said synthesis gas mixture to a temperature of about 1040° K. while continuously maintaining the temperature in excess of that represented by the relation:

$$T = 71 \log (p-0.5) + 300 (0.6-n) + 1020$$

where $T=$ the absolute temperature in ° K.,
$p=$ the pressure in atmospheres and is greater than one atmosphere, and
$n=$ the mol ratio of oxygen to methane and varies from 0.55 to 0.65;

simultaneously adding to the synthesis gas mixture steam and carbon dioxide in a mol ratio of 2:1, the amount of said steam and carbon dioxide being expressed by the relation:

$$f = \frac{3n - 0.339 \log (p+1.7) - 1.41}{0.113 \log (p+1.7) - 1.53}$$

where $f=$ the sum of the mols of the steam and carbon dioxide, and $p$ and $n$ are as defined above, and then cooling the synthesis gas mixture to a temperature below 1040° K.

References Cited in the file of this patent

UNITED STATES PATENTS

| | | |
|---|---|---|
| 803,557 | Claudel | Nov. 7, 1905 |
| 1,843,063 | Burke | Jan. 26, 1932 |
| 2,051,363 | Beekley | Aug. 18, 1936 |
| 2,292,355 | Ayers | Aug 11, 1942 |
| 2,346,754 | Hemminger | Apr. 18, 1944 |
| 2,520,925 | Garbo | Sept. 5, 1950 |